United States Patent
Hall et al.

(10) Patent No.: US 7,339,678 B2
(45) Date of Patent: Mar. 4, 2008

(54) METHOD AND SYSTEM OF USING ODD HARMONICS FOR PHASE GENERATED CARRIER HOMODYNE

(75) Inventors: David B. Hall, La Crescenta, CA (US); Paul L. Greene, La Crescenta, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 274 days.

(21) Appl. No.: 11/270,058

(22) Filed: Nov. 9, 2005

(65) Prior Publication Data

US 2007/0103692 A1    May 10, 2007

(51) Int. Cl.
    *G01B 9/02*    (2006.01)
    *G01B 9/10*    (2006.01)
(52) U.S. Cl. .................... 356/478; 250/227.27
(58) Field of Classification Search ................ 356/478; 385/12; 250/227.19, 227.27
    See application file for complete search history.

(56) References Cited

U.S. PATENT DOCUMENTS

| | | | |
|---|---|---|---|
| 5,283,625 A | 2/1994 | Bunn, Jr. | |
| 5,923,030 A * | 7/1999 | Assard et al. | 250/227.19 |
| 6,072,921 A | 6/2000 | Frederick et al. | |
| 6,122,057 A * | 9/2000 | Hall | 356/450 |
| 6,134,015 A * | 10/2000 | Hall | 356/478 |
| 6,363,034 B1 | 3/2002 | Varnham | |
| 6,580,314 B1 | 6/2003 | Deus, III et al. | |
| 6,600,586 B1 * | 7/2003 | Hall | 398/207 |
| 6,944,231 B2 | 9/2005 | Scrofano | |
| 7,081,959 B2 * | 7/2006 | Waagaard et al. | 356/478 |
| 2004/0257580 A1 | 12/2004 | Hall | |
| 2005/0007597 A1 | 1/2005 | Hall | |

* cited by examiner

*Primary Examiner*—Patrick Connolly

(57) ABSTRACT

A method and system for providing fast interrogation of a signal received from a fiber optic sensor array using a low drive voltage, by modulating the array signal with a phase generated carrier optical signal having an odd harmonic modulation frequency, sending it to an interferometric system, and demodulating the array signal using a demodulation algorithm that is independent of the phase offset. A detector using direct detection method can be used to determine the signal's phase information. The odd harmonic modulation method allows the selection of a desirable odd harmonic PGC frequency with low drive voltage while providing similar performance of the usual PGC frequency that requires a higher drive voltage.

21 Claims, 4 Drawing Sheets

METHOD AND SYSTEM OF USING ODD HARMONICS FOR PHASE GENERATED CARRIER HOMODYNE

BACKGROUND OF THE INVENTION

1. Field of the Invention

The invention relates generally to signal processing techniques for fiber optic interferometric sensor systems. More particularly, the invention relates to a method and system of using odd harmonics for Phase Generated Carrier (PGC) homodyne technique that utilizes an eight-point or sixteen-point Fast Fourier Transform (FFT) demodulation algorithm.

2. Description of the Related Art

The present invention is related to application Ser. No. 10/600,099, entitled "CALCULATION OF SENSOR ARRAY INDUCED PHASE ANGLE INDEPENDENT FROM DEMODULATION PHASE OFFSET OF PHASE GENERATED CARRIER," application Ser. No. 10/615,729, entitled "FILTERED CALCULATION OF SENSOR ARRAY INDUCED PHASE ANGLE INDEPENDENT FROM DEMODULATION PHASE OFFSET OF PHASE GENERATED CARRIER," and U.S. patent, U.S. Pat. No. 6,944,231, entitled "DEMODULATION OF MULTIPLE-CARRIER PHASE-MODULATED SIGNALS," assigned to the assignee of the present invention. These two applications and patent are incorporated herein by reference.

Acoustic sensor systems for underwater applications are well known in the art. In seismic or oil exploration, these sensor systems are typically employed in static arrays of multiple acoustic transducers that are placed on or beneath the sea floor. Each sensor array reacts to acoustic pressure waves, initiated from a surface ship, by modulating an input signal and the collected data is then processed and analyzed to determine optimum drilling locations or to monitor undersea geological structures. In military surveillance, these sensor systems are usually mounted to a submarine hull or towed behind the submarine. The sensor system provides underwater listening capabilities and relative position information.

One sensor system that employs modulation techniques is fiber optic sensors. The fiber optic sensor arrays have sensing elements, for example, fiber optic interferometers. The signals from these sensing elements are often multiplexed, by way of example, using time division multiplexing (TDM), frequency division multiplexing (FDM) and/or wavelength division multiplexing (WDM). In TDM, signals from various sensor arrays are carried on a single transmission path by interleaving portions of each signal in time. FDM simultaneously modulates different carrier frequencies on the same medium by allocating to each signal a different frequency band, while WDM involves multiplexing multiple wavelengths on a single fiber.

Typically, in TDM systems, a modulated optical signal is input to the sensor array and various demodulation techniques have been proposed and are used for correlating the signals from the array of sensors that produce the signals. Techniques providing sensing information encoded on carrier signals include phase-generated carrier (PGC) homodyne, PGC synthetic heterodyne and differential delay heterodyning.

Common to all demodulation methods for fiber optic interferometric arrays, is the acquisition of an in-phase term proportional to the cosine of the interferometer phase shift and a quadrature term proportional to the sine of the interferometer phase shift. The sine of the sensor phase shift is known as the quadrature term Q; and the cosine of the sensor phase shift is referred to as the in-phase term I. The angle of the phase shift is determined by calculating the ratio of Q/I, which is the tangent of the sensor phase shift. The amplitudes of the sine and cosine terms must be set equal by a normalization procedure to ensure the successful implementation of an arc tangent routine to find the sensor phase shift.

Existing demodulation algorithms, such as Optiphase Inc.'s six step algorithm, are dependent on a predetermined phase offset associated with the sampling of the phase generated carrier. Also, existing demodulation algorithms use a slow PGC at tens of kilohertz that requires the interrogation of multiple pulses (six for the Optiphase method) at different times to acquire one acoustic data point for a given interferometric sensor (hydrophone) return.

Assignee recently developed an eight point (samples at 45° intervals) and a sixteen point (samples at 22.5° intervals) Fast Fourier Transform (FFT) demodulation algorithms that decouples the algorithm performance from the phase generated carrier demodulation phase offset. Typically, the frequency of the PGC in this case is 5-10 MHz. The eight point FFT demodulation algorithm operates with a sampling rate that is eight times that of the PGC frequency. Such high sampling rate often places great demands on the sampling circuitry. Because an inverse relationship exists between the PGC frequency and the drive voltage, such as for a lithium niobate fiber pigtailed phase modulator, the demodulation algorithm operating at low frequency requires excessive drive voltage. For example, at 10 MHz, a peak to peak voltage of 10 volts suffices, whereas at 2.5 MHz, an excessive peak to peak drive voltage of 40 volts is required.

Since the trend in the industry is to lower power consumption for certain applications of fiber optic sensor arrays, the resulting sample rate of the eight point FFT demodulation algorithm can be reduced to 20 Mega samples per second or less to make use of low power analog to digital converters at the receiver. This, in turn, lowers the PGC frequency to 2.5 MHz or less, which ironically requires excessive drive voltage. Measures such as resonant tank circuits or transformers are less than satisfactory solutions to the problem. Consequently, there remains much scope in the art for interrogating desirable PGC frequencies at low drive voltages. Therefore, there is a need in the art for a signal processing system providing fast interrogation of sensor pulses with low drive voltages, preferably not to exceed 10-15 volts peak to peak.

SUMMARY OF THE INVENTION

The method and system of the present invention significantly reduces the power consumption of fiber optic sensor arrays that utilize demodulation algorithms independent of the path mismatch. The trend in the industry is to lower power consumption for certain applications of fiber optic sensor arrays so as to make use of low power analog to digital converters at the receiver. This, in turn, lowers the phase generated carrier (PGC) frequency to 2.5 MHz or less, which ironically requires excessive drive voltage.

The method uses a PGC having a frequency that is an odd harmonic of the usual PGC frequency. The usual PGC frequency is one eighth of the TDM signal sampling rate. Therefore, the odd harmonic frequency is 3/8, 5/8, 7/8 etc. of the TDM signal sampling rate. The odd harmonic frequency does not affect the sampling rate, the pulse width, the time interval between successive sensor signals, or the demodulation algorithm. There is a default timing sequence of sampling eight successive points for the PGC at the usual frequency and incorporating them into the eight point FFT demodulation algorithm. This timing sequence is changed when an odd harmonic of the usual PGC frequency is used. When looking at the successive odd harmonic frequencies in ascending order 3, 5, 7, etc. there is a repetitive pattern in the associated timing sequences.

One embodiment of the invention provides an acoustic signal processing system with low drive voltage having a phase modulator for encoding an input optical signal with a phase generated carrier signal that is an odd harmonic of the usual modulation frequency, and a fiber optic sensor with a path mismatch. The signal processing system includes direct detection for receiving the input optical signals from the interferometric sensor and determining the phase information using a demodulation algorithm independent of the phase generated carrier phase offset. In another embodiment, the signal processing system includes a demodulator for computing acoustic phase information using a demodulation algorithm that is independent of the phase offset.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein.

DESCRIPTION OF THE PREFERRED EMBODIMENTS

Methods and systems that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
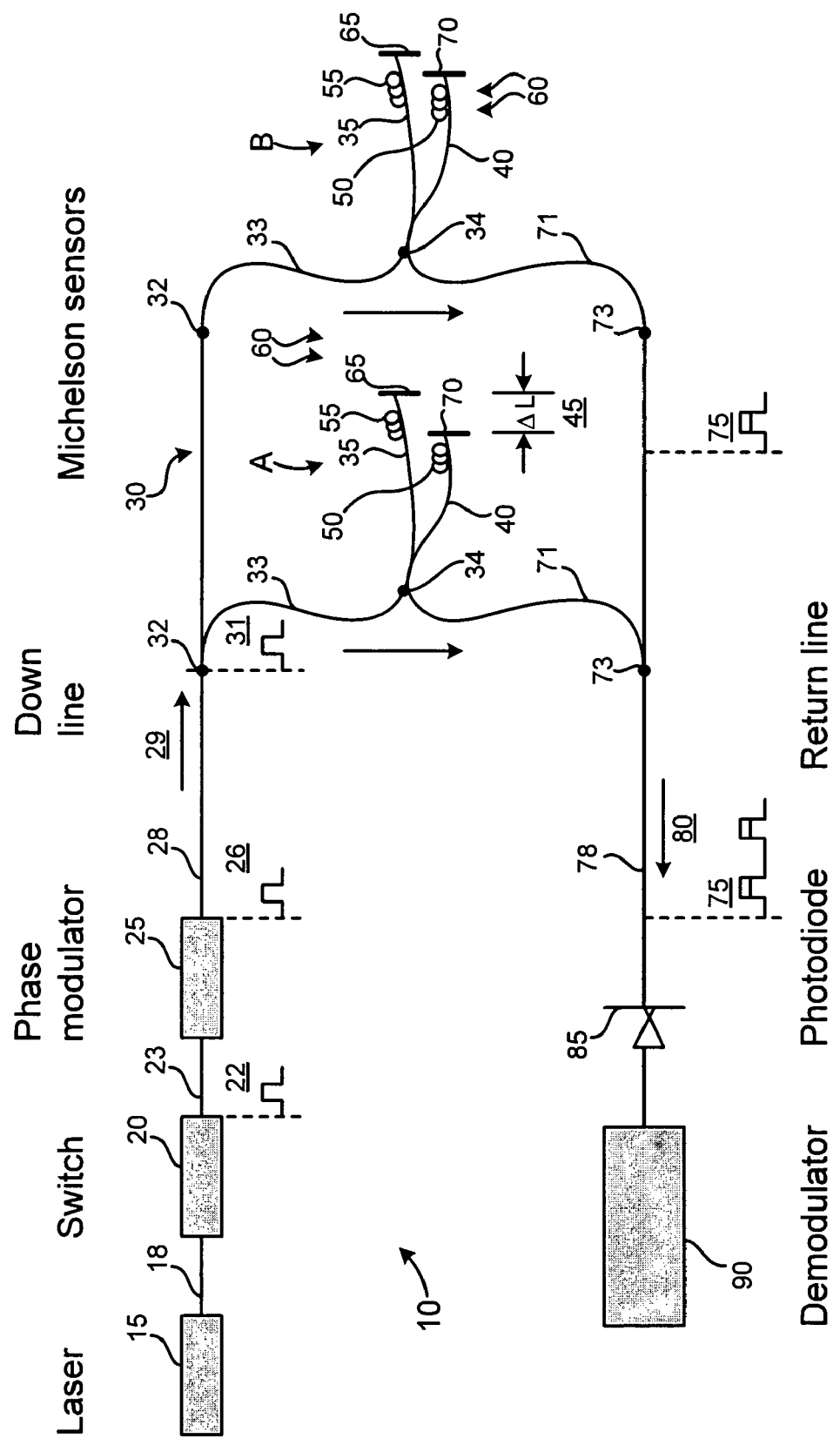
FIG. 1 illustrates a schematic of a signal processing system according to one embodiment of the present invention

FIG. 1 illustrates a schematic of a signal processing system 10 according to one embodiment of the present invention. An optical source 15, with a narrow line width such as a diode pumped fiber laser, delivers a continuous-wave optical signal through a fiber optic conductor 18, such as a fiber optic cable. In one embodiment, the laser light is a polarized light beam. The fiber optic conductor 18 conducts the laser light from the optical source 15 to an optical switch 20. The optical switch 20 is well known in the art for providing controlled periodic switching such that the output signal is a laser light pulse 22. The optical switch 20 is a time division multiplexer (TDM), which is also well known in the art.

The pulsed array signal 22 travels through the fiber optic conductor 23 and into a phase modulator 25. The phase modulator 25 applies a phase generated carrier (PGC) modulation to the pulsed signal 22. The usual phase generated carrier frequency is inversely proportional to the required drive voltage on the phase modulator. For example, at 10 MHz PGC frequency, the peak to peak voltage is about 10 volts, while at 2.5 MHz PGC frequency, an excessive peak to peak drive voltage of 40 volts is required.

Since the trend in the industry is to lower power consumption of the signal processing system 10, the resulting sample rate for an eight point or sixteen point FFT demodulation algorithm, incorporated herein by reference, can be reduced to 20 Mega samples per second or less to make use of low power analog to digital converters at the receiver. This, in turn, lowers the PGC frequency to 2.5 MHz or less, which ironically requires excessive drive voltage.

According to one method embodying the present invention, a PGC having a frequency that is an odd harmonic of the usual PGC frequency is applied to the pulsed signal 22. For a system utilizing an eight point FFT demodulation algorithm, the usual PGC frequency is one eighth of the TDM signal sampling rate. Hence, the applied odd harmonic frequency will be 3/8, 5/8, 7/8 etc. of the TDM signal sampling rate.

The odd harmonic modulation method allows the selection of a desirable odd harmonic PGC frequency with low drive voltage while providing similar performance of the usual PGC frequency that requires a higher drive voltage. For example, and as will be explained in detail below, a convenient 11.25 MHz PGC can be used to handle a system with a 10 MHz sampling rate instead of the unworkable 1.25 MHz PGC. The odd harmonic modulation frequency does not affect the sampling rate, the pulse width, the time interval between successive array signals, or the demodulation algorithm.

In one embodiment, the optical switch 20 and the phase modulator 25 can be reversed such that the optical signal, produced by the optical source 15, travels through a phase modulator 25 and into an optical switch 20. The phase modulator 25 conveys the modulated pulsed signal 26 down line 29 to an interferometric system 30 via a fiber optic conductor 28. The interferometric system can have fiber optic Mach-Zehnder interferometers or fiber optic Michelson interferometers.

FIG. 1 illustrates an interferometric system 30 utilizing the Michelson interferometer architecture. The interferometric system 30 has two Michelson interferometers A and B. The modulated pulsed signal 31 is partially diverted into a rung 33 of interferometer A using a tap coupler 32. In the rung 33, the modulated pulsed signal 31 is split using a 50-50 coupler 34, such that half of the laser light travels along sensing leg 40 and the other along reference leg 35 of the interferometer 30. The coupler 34 both splits and recombines the modulated pulsed signal 31. To provide path mismatch, sensing leg 40 and reference leg 35 have different fiber optic lengths separated by a distance $\Delta L$ 45.

The Michelson interferometer has a hydrophone section 50 and reference coil 55 located on reference leg 35 and sensing leg 40, respectively. The hydrophone section 50 responds to acoustical energy signal, for example, sound in the water, represented by arrows 60, to provide a phase-discriminated interferometric signal analogous to the acoustical energy signal. The reference coil 55 is used to compensate for the lengths of legs 35 and 40 so that they are separated by distance $\Delta L$ 45. The modulated pulsed signal 31, after traversing the length of legs 35 and 40, is then reflected back by reflectors, such as mirrors 65 and 70. Coupler 34 then recombines the modulated pulsed signal 31 from each leg 35 and 40.

About half of the optical signals travel down a return line via a fiber optic conductor 78, while the other half travel in opposite direction towards the optical laser source 15. The reflected signal 75 traveling towards return line will go through rung 71, while the optical signals traveling towards the laser source 15 will go through rung 33. An isolator may be used before the laser source to isolate the optical signals traveling in opposite direction.

The reflected signal 75 traveling in direction 80 is received by a detector, such as a photodiode 85, which detects optical signals and generates electrical signals in response. In one embodiment, the reflected signal 75 is received by a polarization diversity receiver with associated demodulation electronics, whereby the polarization diversity receiver comprises multiple photodiodes 85. The electrical signals are then received by a demodulator 90, which computes acoustic phase information using a demodulation algorithm independent of the phase offset. The demodulation algorithm can be an eight sample or sixteen sample FFT demodulation algorithm, as explained in a application Ser. No. 10/615,729, entitled "FILTERED CALCULATION OF SENSOR ARRAY INDUCED PHASE ANGLE INDEPENDENT FROM DEMODULATION PHASE OFFSET OF PHASE GENERATED CARRIER," assigned to the assignee of the present invention. This application is incorporated herein by reference. In another embodiment, the electrical signal is received by direct detection.

Figure 2:
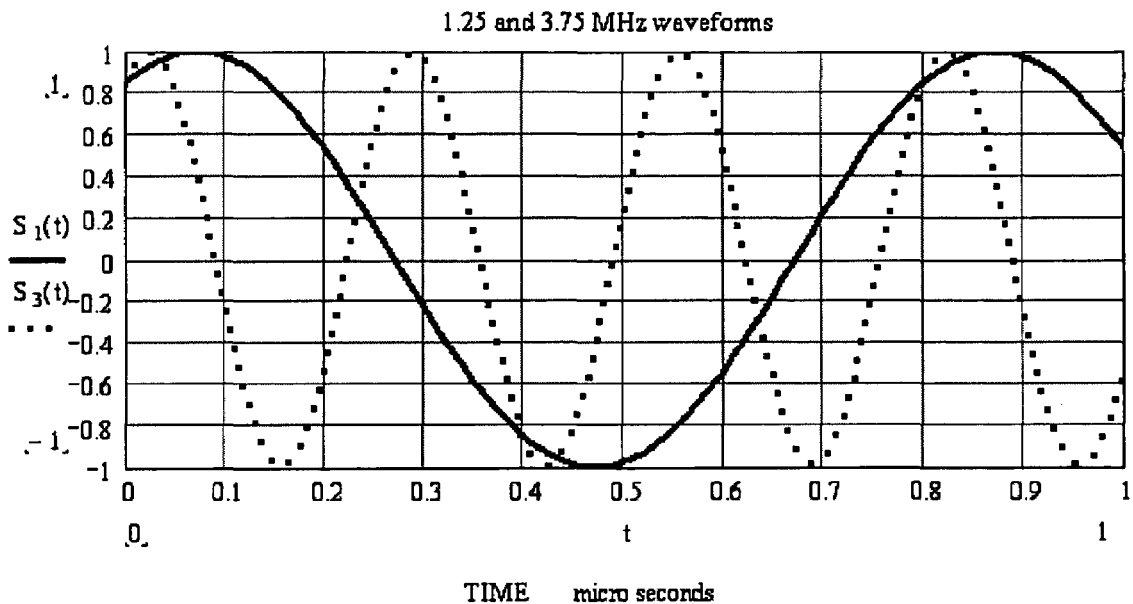
FIG. 2 is a graph of a phase generated carrier waveform at 1.25 MHz and 3.75 MHz sampled at 10 MHz, illustrating the effect of odd harmonic frequency on an eight point FFT demodulation algorithm, in accordance to a method embodying the present invention.

FIG. 2 is a exemplary graph illustrating the effect of odd harmonic PGC frequency on an eight sample FFT demodulation algorithm, in accordance to a method embodying the present invention. Signal $S_1(t)$ at 1.25 MHz and $S_3(t)$ at 3.75 MHz are given by the equations:

$$S_1(t) := \sin\left(2 \cdot \pi \cdot \frac{f}{8} \cdot t + \beta\right) \quad (1)$$

$$S_3(t) := \sin\left(6 \cdot \pi \cdot \frac{f}{8} \cdot t + \beta\right) \quad (2)$$

Both $S_1(t)$ and $S_3(t)$ are sampled at f=10 MHz corresponding to 0.1 μsec timing interval, and phase offset $\beta$ is set to 1 radian. $S_1(t)$ is sampled in successive order as shown by the ordinary timing sequence. Table 1 illustrates that signal $S_1(t)$ provides substantially equivalent results to signal $S_3(t)$ simply by changing the order of the timing sequence. Ordinarily, $S_1(t)$ would require a drive voltage much greater than $S_3(t)$. Since the third harmonic $S_3(t)$ provides similar results, it can be substituted for $S_1(t)$ and require a fraction of the peak to peak drive voltage.

TABLE 1

| | |
|---|---|
| $S_1(0) = 0.841$ | $S_3(0) = 0.841$ |
| $S_1(0.1) = 0.977$ | $S_3(0.3) = 0.977$ |
| $S_1(0.2) = 0.540$ | $S_3(0.6) = 0.540$ |
| $S_1(0.3) = -0.213$ | $S_3(0.1) = -0.213$ |
| $S_1(0.4) = -0.841$ | $S_3(0.4) = -0.841$ |
| $S_1(0.5) = -0.977$ | $S_3(0.7) = -0.977$ |
| $S_1(0.6) = -0.540$ | $S_3(0.2) = -0.540$ |
| $S_1(0.7) = 0.213$ | $S_3(0.5) = 0.213$ |

Figure 3:
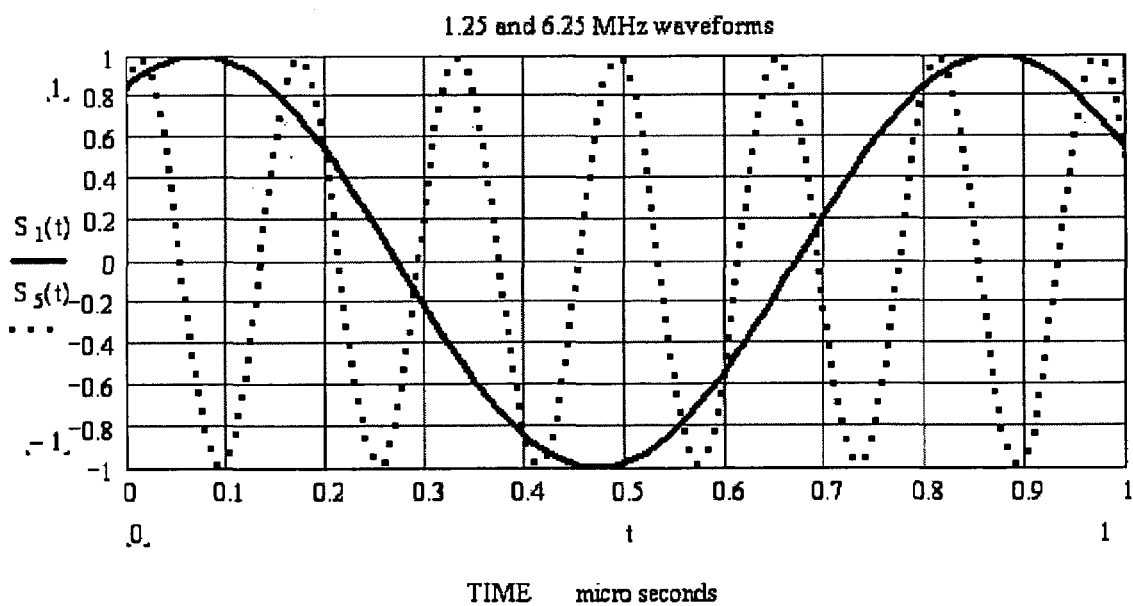
FIG. 3 is an exemplary graph of a phase generated carrier waveform at 1.25 MHz and 6.25 MHz sampled at 10 MHz, illustrating the effect of odd harmonic frequency on an eight point FFT demodulation algorithm, in accordance to a method embodying the present invention.
Figure 4:
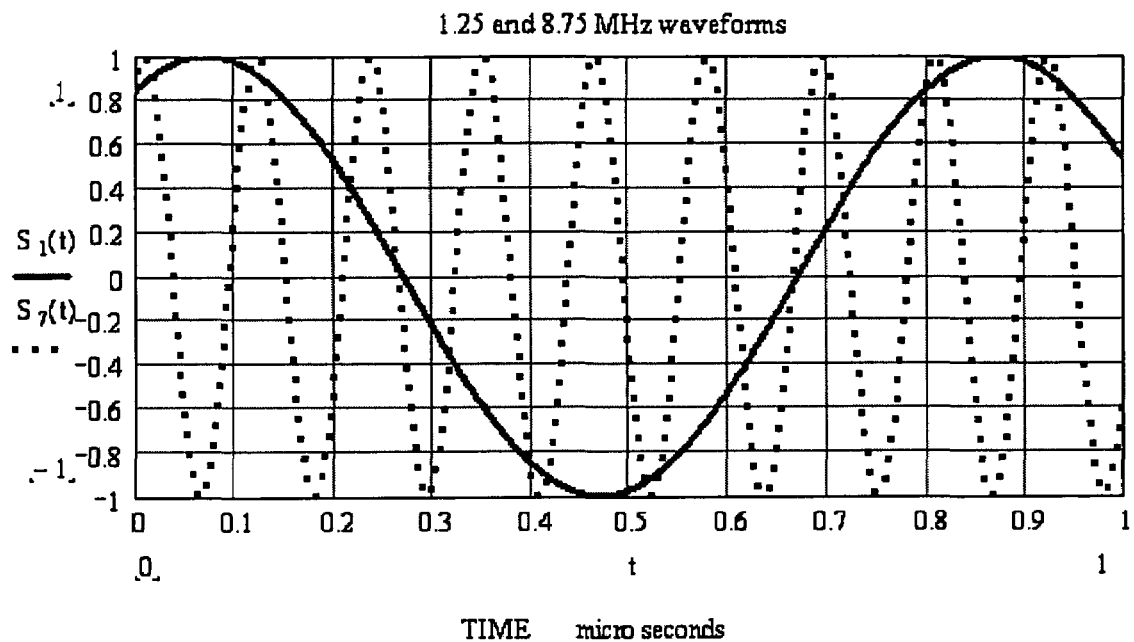
FIG. 4 is an exemplary graph of a phase generated carrier waveform at 1.25 MHz and 8.75 MHz sampled at 10 MHz, illustrating the effect of odd harmonic frequency on an eight point FFT demodulation algorithm, in accordance to a method embodying the present invention.
Figure 5:
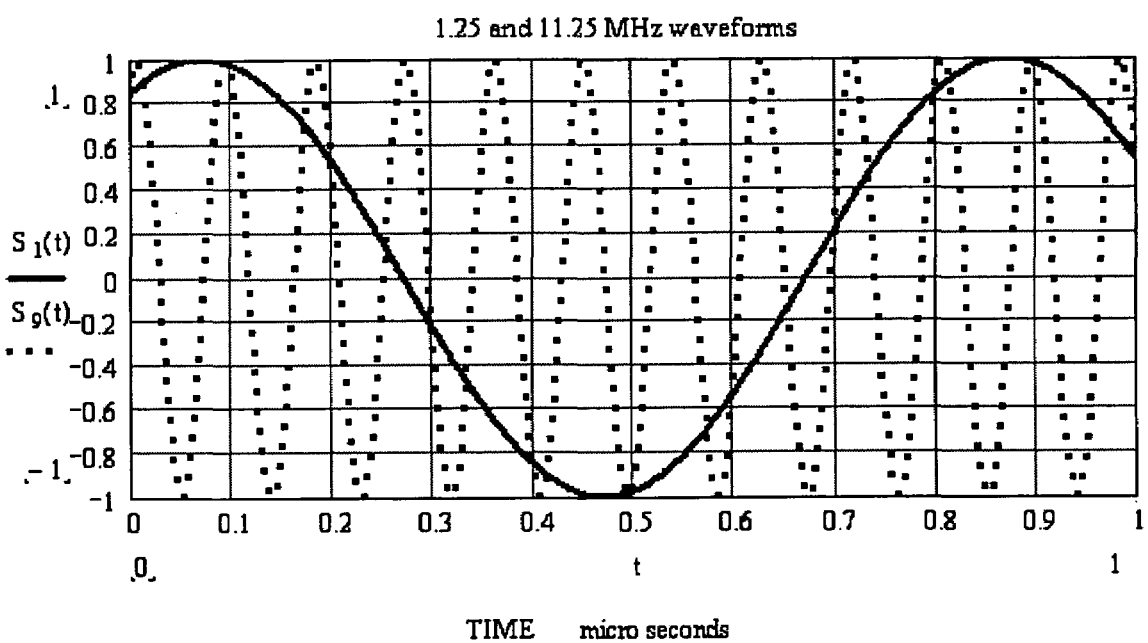
FIG. 5 is an exemplary graph of a phase generated carrier waveform at 1.25 MHz and 11.25 MHz sampled at 10 MHz, illustrating the effect of odd harmonic frequency on an eight point FFT demodulation algorithm, in accordance to a method embodying the present invention.
Figure 6:
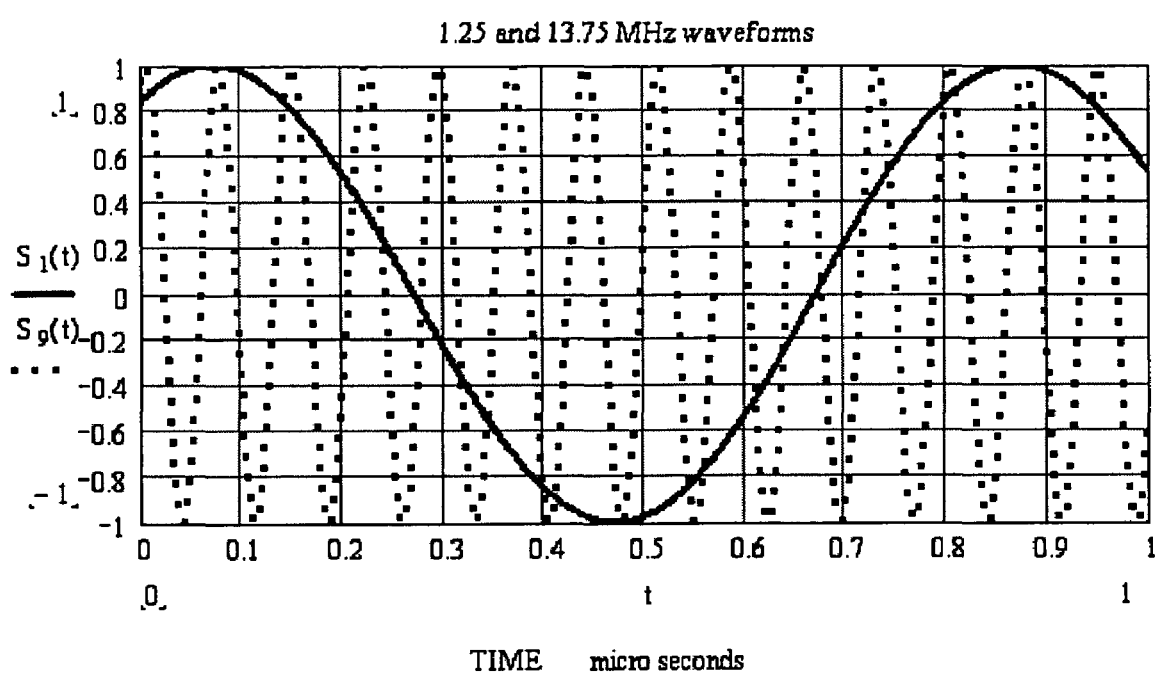
FIG. 6 is an exemplary graph of a phase generated carrier waveform at 1.25 MHz and 13.75 MHz sampled at 10 MHz, illustrating the effect of odd harmonic frequency on an eight point FFT demodulation algorithm, in accordance to a method embodying the present invention.

FIGS. 3-6 present exemplary graphs of PGC waveforms at fifth, seventh, ninth, and eleventh harmonics respectively, in accordance to a method embodying the present invention. FIG. 3 compares signal $S_1(t)$ at 1.25 MHz to $S_5(t)$ at 6.25 MHz, FIG. 4 compares signal $S_1(t)$ at 1.25 MHz to $S_7(t)$ at 8.75 MHz, FIG. 5 compares signal $S_1(t)$ at 1.25 MHz to $S_9(t)$ at 11.25 MHz, and FIG. 6 compares signal $S_1(t)$ at 1.25 MHz to $S_{11}(t)$ at 13.75 MHz. The equations for the fifth, seventh, ninth, and eleventh harmonics respectively are:

$$S_5(t) := \sin\left(10 \cdot \pi \cdot \frac{f}{8} \cdot t + \beta\right) \quad (3)$$

$$S_7(t) := \sin\left(14 \cdot \pi \cdot \frac{f}{8} \cdot t + \beta\right) \quad (4)$$

$$S_9(t) := \sin\left(18 \cdot \pi \cdot \frac{f}{8} \cdot t + \beta\right) \quad (5)$$

$$S_{11}(t) := \sin\left(22 \cdot \pi \cdot \frac{f}{8} \cdot t + \beta\right) \quad (6)$$

Like Table 1, Table 2 illustrate the relative timing sequence between signal $S_1(t)$ and its respective harmonic signals.

TABLE 2

| | | | | |
|---|---|---|---|---|
| $S_1(0) = 0.841$ | $S_5(0) = 0.841$ | $S_7(0) = 0.841$ | $S_9(0) = 0.841$ | $S_{11}(0) = 0.841$ |
| $S_1(0.1) = 0.977$ | $S_5(0.5) = 0.977$ | $S_7(0.7) = 0.977$ | $S_9(0.1) = 0.977$ | $S_{11}(0.3) = 0.977$ |
| $S_1(0.2) = 0.540$ | $S_5(0.2) = 0.540$ | $S_7(0.6) = 0.540$ | $S_9(0.2) = 0.540$ | $S_{11}(0.6) = 0.540$ |

TABLE 2-continued

| | | | | |
|---|---|---|---|---|
| $S_1(0.3) = -0.213$ | $S_5(0.7) = -0.213$ | $S_7(0.5) = -0.213$ | $S_9(0.3) = -0.213$ | $S_{11}(0.1) = -0.213$ |
| $S_1(0.4) = -0.841$ | $S_5(0.4) = -0.841$ | $S_7(0.4) = -0.841$ | $S_9(0.4) = -0.841$ | $S_{11}(0.4) = -0.841$ |
| $S_1(0.5) = -0.977$ | $S_5(0.1) = -0.977$ | $S_7(0.3) = -0.977$ | $S_9(0.5) = -0.977$ | $S_{11}(0.7) = -0.977$ |
| $S_1(0.6) = -0.540$ | $S_5(0.6) = -0.540$ | $S_7(0.2) = -0.540$ | $S_9(0.6) = -0.540$ | $S_{11}(0.2) = -0.540$ |
| $S_1(0.7) = 0.213$ | $S_5(0.3) = 0.213$ | $S_7(0.1) = 0.213$ | $S_9(0.7) = 0.213$ | $S_{11}(0.5) = 0.213$ |

Table 3 summarizes all harmonic timing sequences relative to signal $S_1(t)$. The eight degrees represent the eight samples used by the eight point FFT demodulation algorithm.

TABLE 3

| harmonic | 0 deg | 45 deg | 90 deg | 135 deg | 180 deg | 225 deg | 270 deg | 315 deg |
|---|---|---|---|---|---|---|---|---|
| 1 | 0 | 1 | 2 | 3 | 4 | 5 | 6 | 7 |
| 3 | 0 | 3 | 6 | 1 | 4 | 7 | 2 | 5 |
| 5 | 0 | 5 | 2 | 7 | 4 | 1 | 6 | 3 |
| 7 | 0 | 7 | 6 | 5 | 4 | 3 | 2 | 1 |
| 9 | 0 | 1 | 2 | 3 | 4 | 5 | 6 | 7 |
| 11 | 0 | 3 | 6 | 1 | 4 | 7 | 2 | 5 |

Examination of Table 3 shows a repetitive pattern with the harmonic number. The first and ninth harmonics are the same, the third and eleventh harmonics are the same, and so on. Note that a nine-fold increase in the PGC frequency yields a result that has the same timing sequence. For example, a convenient 11.25 MHz PGC can be used to handle a system with a 10 MHz sampling rate instead of the more or less unworkable PGC at 1.25 MHz, which would ordinarily require an excessive peak to peak drive voltage. This method can be employed without any change to the eight point FFT demodulation routine. Hence, this substitution method allows the signal processing system 10 to operate at a considerably less drive voltage, while utilizing PGC frequencies amenable to low power analog and digital converters at the receiver.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. A method for fast interrogation of a signal-of-interest, comprising the steps of:
   applying to a signal-of-interest a phase generated carrier modulated optical signal at a modulation frequency that is an odd harmonic of a predetermined frequency;
   passing the signal-of-interest through an interferometric system; and
   demodulating the signal-of-interest using a demodulation algorithm that is independent of a phase offset.

2. The method of claim 1, wherein the demodulation algorithm is an eight point Fast Fourier Transform demodulation algorithm.

3. The method of claim 1, wherein the demodulation algorithm is a sixteen point Fast Fourier Transform demodulation algorithm.

4. The method of claim 1, wherein the signal-of-interest is forwarded to a time division multiplexer to facilitate multiple transmission.

5. The method of claim 1, wherein the odd harmonic modulation frequency is at a relatively low drive voltage.

6. The method of claim 5, wherein the drive voltage is less than 15 volts peak to peak.

7. A method for processing a signal received from a fiber optic sensor array comprising the steps of:
   modulating the signal with a phase generated carrier optical signal at a modulation frequency that is an odd harmonic of a predetermined frequency;
   delivering the signal to an interferometric system; and
   demodulating the signal using a demodulation algorithm that is independent of a predetermined phase offset associated with a sampling of the phase generated carrier.

8. The method of claim 7, wherein the demodulation algorithm is an eight point demodulation algorithm.

9. The method of claim 7, wherein the demodulation algorithm is a sixteen point demodulation algorithm.

10. The method of claim 7 further comprises the step of:
    multiplexing the array signal using a time division multiplexer;
    and wherein the multiplexing step occurs before the modulating step.

11. The method of claim 7 further comprises the step of:
    multiplexing the array signal using a time division multiplexer;
    and wherein the multiplexing step occurs after the modulating step.

12. The method of claim 7, wherein the applied odd harmonic modulation frequency maintains at least one of a same sampling rate, a same pulse width, and a same time interval between successive array signals.

13. The method of claim 7, wherein modulating with an odd harmonic modulation frequency provides (allows for) low power consumption of the fiber optic sensor array.

14. An acoustic signal processing system with fast interrogation of a signal received from a fiber optic interferometric sensor array, the system comprising:
    a light source for providing an input optical signal;
    a phase modulator for encoding the input optical signal with a phase generated carrier optical signal at a modulation frequency that is an odd harmonic of a predetermined frequency
    a fiber optic interferometric sensor responsive to acoustic pressure waves for modulating an input optical signal in accordance with the acoustic pressure wave' and a demodulator that computes acoustic phase information using a demodulation algorithm that is independent of a phase offset.

15. The signal processing system of claim 14, wherein the demodulation algorithm is an eight point demodulation algorithm.

16. The signal processing system of claim 14, wherein the demodulation algorithm is a sixteen point demodulation algorithm.

17. The signal processing system of claim 14 further comprising a time division multiplexer.

18. The signal processing system of claim 14, wherein the odd harmonic modulation frequency modulator maintains at least one of a same sampling rate, a same pulse width, and a same time interval between successive array signals.

19. The signal processing system of claim 14, wherein the odd harmonic modulation frequency modulator utilizes low drive voltage.

20. The signal processing system of claim 19, wherein the drive voltage is less than 15 volts peak to peak.

21. An acoustic signal processing system for fast interrogation of a signal received from a fiber optic interferometric sensor array, the system comprising:

a light source for providing an input optical signal;

a phase modulator for encoding an input optical signal with a phase generated carrier optical signal at a modulation frequency that is an odd harmonic of a predetermined frequency;

a fiber optic interferometric sensor responsive to acoustic pressure waves for modulating the input optical signal in accordance with the acoustic pressure wave; and a detector for direct detection of input optical signals from the interferometric sensor, and for determining the phase information using a demodulation algorithm independent of a phase offset.

* * * * *